No. 793,958. PATENTED JULY 4, 1905.
J. F. RICHARDSON.
METHOD OF MAKING BRAZED JOINTS.
APPLICATION FILED MAR. 7, 1904.

Witnesses:
K. H. Butler
E. E. Potter

Inventor
J. F. Richardson,
By N. C. Ever & Co.
Attorneys

No. 793,958. Patented July 4, 1905.

UNITED STATES PATENT OFFICE.

JOHN F. RICHARDSON, OF PITTSBURG, PENNSYLVANIA.

METHOD OF MAKING BRAZED JOINTS.

SPECIFICATION forming part of Letters Patent No. 793,958, dated July 4, 1905.

Application filed March 7, 1904. Serial No. 196,919.

*To all whom it may concern:*

Be it known that I, JOHN F. RICHARDSON, a citizen of the United States of America, residing at Pittsburg, in the county of Allegheny and State of Pennsylvania, have invented certain new and useful Improvements in Methods of Making Brazed Joints, of which the following is a specification, reference being had therein to the accompanying drawings.

This invention has relation to a method of making brazed joints, and has for its object the provision of a novel method of and means for securing a perfect brazing of joints in certain classes of metals which it has heretofore been found difficult to braze in a satisfactory manner.

My invention is particularly applicable to the brazing of broken joints in cast-iron or high-carbon steel.

It has heretofore been difficult to make a good brazed joint between two pieces of cast-iron or high-carbon steel, particularly where the sections to be joined together were broken apart, owing to the fact that the material used for brazing would not flow readily and into a close joint or a crack. It is well known that when a piece of metal is broken the material on each side of the fracture is to a certain extent disintegrated and weakened by the force which produces the fracture, and if, therefore, the pieces be united by brazing them together the material will be liable to be again fractured on lines parallel with the original fracture, owing to the weakness of the metal adjacent to the brazed joint.

In carrying my invention into effect I insert between the adjacent faces of the joint which is to be brazed a thin strip of metal of such character that the brazing material will flow over its surface and attach itself to the adjacent surfaces of the material to be joined, whereby I secure a perfect adhesion of the brazing material throughout the entire surfaces abutting said strip. In addition to the strip of metal which I employ as above described I apply to the material to be joined reinforcing-pieces composed of a material which will serve to conduct the brazing material in the same manner as is done by the aforesaid strip, these reinforcing-pieces crossing the joint or fracture and being socketed in the adjacent sections of the material to be joined and being brazed thereto simultaneously with the brazing of the joint.

Figure 1:
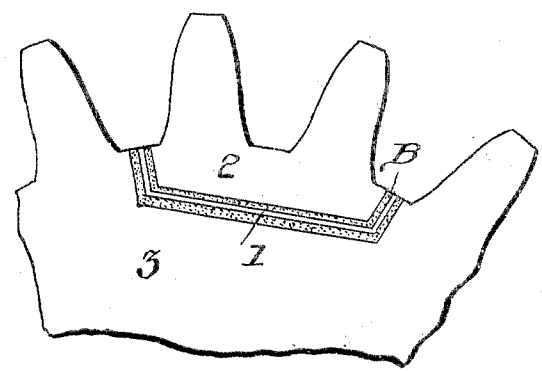
Figure 2:
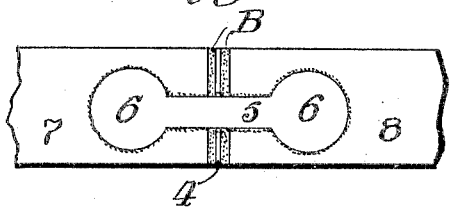
Figure 3:
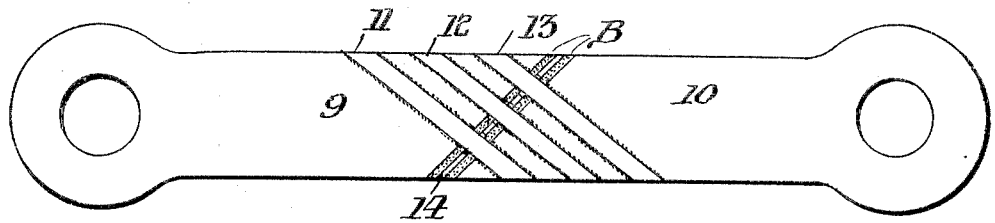
Figures 4, 5:
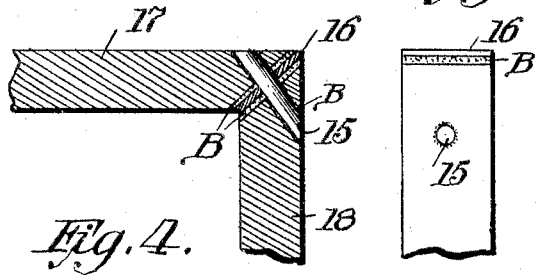
Figure 6:
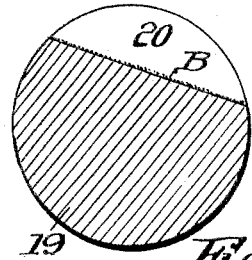

In the accompanying drawings, wherein joints which have been brazed according to my method and by means of the devices appertaining thereto are shown, Figure 1 is a side elevation of a gear-wheel in which two teeth have been removed and replaced by new teeth. Fig. 2 is a plan view of a straight bar, showing one form of reinforcing-piece as applied to a joint brazed by my improved means. Fig. 3 is a plan view of a link, showing a modified form of reinforcing-pieces. Fig. 4 is a plan view of a square frame which has been fractured and brazed at one corner and showing a further modified form of applying the reinforcing-piece. Fig. 5 is an edge view of the article shown in Fig. 4. Fig. 6 is a sectional view of a shaft which has been cracked and brazed according to my improved method.

The first step in my method is to secure a clean surface on the portions which are to be brazed, and this I effect either by washing the surfaces with acid or preferably by abrading by means of a suitable tool, such as a file or an emery-wheel, the latter method being preferable as affording a means for removing the weakened portion of the metal adjacent to the fracture and also widening the fracture, so as to provide room for the joining-strip and brazing material, so as to make the joint without lengthening the article joined. If the joint is to be made without the reinforcing piece or pieces, as may sometimes be the case—as, for instance, where the new teeth are to be inserted in the gear-wheel shown in Fig. 1—I insert between the pieces 2 3 a strip 1 of suitable metal, shaped to conform to the shape of the joint, and I then braze the parts 2 and 3 to each side of the strip 1 by means of a suitable flux and a suitable brazing material.

In Fig. 2 of the drawings, in which I have shown a joint made in a straight bar, I employ in connection with a joining-strip 4 a reinforcing-piece 5, which is socketed in suitable recesses 6 6 in the pieces 7 8 of the article being brazed, this reinforcing-piece 5 being made of material of such character that the brazing material will flow freely over its surface during the brazing operation and will tightly braze it in the recesses 6 6.

In Fig. 3 of the drawings I have shown a joint running at an angle to the sides of the two sections 9 10 to be brazed together, and in this case I have shown reinforcing-pieces 11 12 13, which are let into the surfaces of the sections 9 10 and cross the fracture at substantially right angles, the joining-strip in this figure being lettered 14, the latter being properly shaped on its upper edge to admit of the passage of the reinforcing-pieces 11 12 13.

In Fig. 4 of the drawings I have shown a square frame which has been fractured at one corner, and in this instance a reinforcing-piece 15 is arranged in a hole bored at an angle to the sides of the frame and through the joining-strip 16.

Fig. 5 shows the joining-piece 15 as being located centrally of the sides 17 18 of the frame; but it may be located in any other desirable position.

In Fig. 6 I have illustrated a shaft 19, which has been cracked from the periphery toward the center and in which a joining-strip 20 has been inserted in the crack.

The brazing material in each figure is designated by the letter B. The particular material which I prefer to employ for the joining-strips and for the reinforcing-pieces is steel, and I find that the best effect is produced where the steel is coated previously to being inserted in the joint by some other metal, an excellent material for the strips being galvanized sheet-steel.

The joint formed in the manner above described is extremely strong, and I have demonstrated in actual practice that such joints render the article as strong at the point of fracture as at any other point of equal area throughout the article, particularly where the reinforcing-pieces above described are employed, for the reason that the reinforcing-pieces being of steel are of greater tensile strength than the material which has been brazed and which is ordinarily cast-iron or brittle high-carbon steel.

Having fully described my invention, what I claim as new, and desire to secure by Letters Patent, is—

1. The method of making brazed joints consisting in inserting between the abutting surfaces of the parts to be joined a strip of metal coated with a metal of different character from said surfaces, and then brazing said strip to said surfaces.

2. The method of making brazed joints consisting in abrading the surfaces to be joined, inserting a strip of metal of different material from the sections to be joined between the abutting surfaces of the same and then brazing said strip to said surfaces.

3. A method of making brazed joints consisting in inserting between the adjacent surfaces of the article to be brazed a strip of metal of different character from the article, and inserting a reinforcing-piece in a recess intersecting the joint, and brazing the said strip and the said reinforcing-piece in position.

In testimony whereof I affix my signature in the presence of two witnesses.

JOHN F. RICHARDSON.

Witnesses:
H. C. EVERT,
E. E. POTTER.